(12) United States Patent
Minato et al.

(10) Patent No.: US 8,207,475 B2
(45) Date of Patent: Jun. 26, 2012

(54) WIRE FEEDING UNIT

(75) Inventors: Tatsuji Minato, Fujisawa (JP); Makoto Kondo, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 594 days.

(21) Appl. No.: 12/359,609

(22) Filed: Jan. 26, 2009

(65) Prior Publication Data

US 2009/0242535 A1   Oct. 1, 2009

(30) Foreign Application Priority Data

Mar. 31, 2008  (JP) ................ 2008-092246
Aug. 7, 2008   (JP) ................ 2008-204077

(51) Int. Cl.
*B23K 9/10* (2006.01)
(52) U.S. Cl. ............... 219/137.31; 219/137.44; 901/42
(58) Field of Classification Search .............. 219/75, 219/136, 137.31–137.7; 74/490.01–490.06; 901/42

See application file for complete search history.

(56) References Cited

U.S. PATENT DOCUMENTS

| | | | | |
|---|---|---|---|---|
| 2,244,026 | A * | 6/1941 | Schauer | 408/124 |
| 4,510,825 | A * | 4/1985 | Neron et al. | 81/57.29 |
| 2006/0101936 | A1* | 5/2006 | Inoue et al. | 74/490.01 |
| 2006/0124622 | A1* | 6/2006 | Hubinger et al. | 219/137.31 |

FOREIGN PATENT DOCUMENTS

| | | |
|---|---|---|
| CN | 2547454 Y | 4/2003 |
| CN | 1806989 A | 7/2006 |
| CN | 1913999 A | 2/2007 |
| GB | 2291827 * | 7/1996 |
| JP | 2005-297069 | 10/2005 |
| JP | 2006-150378 | 6/2006 |
| KR | 2002-0045667 | 6/2002 |

OTHER PUBLICATIONS

Korean Office Action issued Apr. 19, 2011, in Patent Application No. 10-2009-0026283 (with English-language translation).
Chinese Office Action issued May 24, 2011, in Patent Application No. 200910006141.3 (with English-language translation).

* cited by examiner

*Primary Examiner* — Timothy J Dole
(74) *Attorney, Agent, or Firm* — Oblon, Spivak, McClelland, Maier & Neustadt, L.L.P.

(57) ABSTRACT

A wire feeding unit for feeding a welding wire in a torch cable of a welding robot, the torch cable passing through the inside of an upper arm in its direction, includes a body member, which is mounted on an inner periphery of the upper arm in a state of being freely pivotable around the axis of the upper arm, and to which the torch cable is installed, and a feed roller mounted to the body member in a state of being freely rotatable around an axis orthogonal to the axis of the arm. Here, the welding wire exposed out of the torch cable is in contact with the circumferential surface of the feed roller and is fed by the rotation of the feed roller in a direction of the axis of the upper arm. According to the configuration like this, when an arm is pivoted, the torch cable passing through the arm is able to be prevented from being twisted.

5 Claims, 8 Drawing Sheets

WIRE FEEDING UNIT

BACKGROUND OF THE INVENTION

1. Field of the Invention

The present invention relates to a wire feeding unit for feeding a welding wire to a welding torch, the welding wire being inserted through a torch cable that passes through an arm (also referred to as an arm member) of a welding robot and is connected to the welding torch.

2. Description of the Related Art

There is known a welding robot equipped with a multiarticular arm, a torch cable of which is passed from a base end portion of an upper arm through the inside of the upper arm and is connected to a welding torch provided at a tip portion of the upper arm, the torch cable accommodating a welding wire, an electrically conductive wire, and the like (refer to, for example, Japanese Unexamined Patent Application Publication No. 2006-150378).

In a welding robot like this, since a torch cable is not arranged around the upper arm, there is no fear that the torch cable comes into contact with a work piece or surrounding equipment when the multiarticular arm is pivoted or tilted.

Incidentally, the welding robot has a wire feeding unit fixed on a base end portion of the upper arm, the wire feeding unit serving to feed a welding wire to the welding torch. In the wire feeding unit, the welding wire is pinched between a pair of rollers and is fed toward the tip side of the upper arm by the rotation of the rollers.

SUMMARY OF THE INVENTION

In a conventional configuration in which a wire feeding unit is fixed in a base end portion of an upper arm, since the base end portion of a torch cable is fixed to the wire feeding unit, as described above, when the tip portion of the upper arm is pivoted around its axis and the torch cable pivots around the axis by following the pivoting, the torch cable is partially twisted. Then, there arises a problem that a torch cable subjected to repeated twisting loses its durability.

The present invention addresses the above problems with the object of providing a wire feeding unit that is capable of preventing a torch cable passing through in an arm from being twisted when the arm is pivoted around its axis.

In order to solve the above problem, the present invention provides a wire feeding unit for feeding a welding wire that is inserted through a torch cable of a welding robot, the torch cable being passed from a base end portion of an arm through the inside of the arm and being connected to a welding torch at a tip portion of the arm. The wire feeding unit includes a body member, which is mounted on an inner periphery of the arm in a state of being freely pivotable around the axis of the arm, and to which the torch cable is installed, and a feed roller mounted to the body member in a state of being freely rotatable around an axis orthogonal to the axis of the arm; wherein in the body member the welding wire is passed, in a state of being exposed out of the torch cable, through a portion in which the feed roller is mounted, and the welding wire inserted through the torch cable is fed by the rotation of the feed roller in a direction of the axis of the arm.

In this configuration, when the arm is pivoted around its axis and the torch cable pivots around the axis by following the pivoting, the body member also pivots around the axis of the arm by following the pivoting of the torch cable, so the torch cable is prevented from being partially twisted and its durability is able to be enhanced.

The above wire feeding unit may be configured such that a driving unit for rotating the feed roller is fixed on the arm, and a transmission mechanism for transmitting the rotation of an output shaft of the driving unit includes a first bevel gear mounted to the body member in a state of being freely rotatable around the axis of the arm, and a second bevel gear mounted to the body member in a state of being freely rotatable around an axis orthogonal to the axis of the arm; wherein the rotation transmitted from the output shaft of the driving unit to the first bevel gear is transmitted to the feed roller though the second bevel gear.

Here, in the case that the weight of the body member is large, there is a fear that, when the torch cable is pivoted around an axis, the twisting of the torch cable may not be effectively prevented due to the wrong following ability of the body member with respect to the pivoting of the torch cable. For this reason, in the above configuration, the body member is made smaller and lighter by fixing the driving unit on the arm, and thereby the following ability of the body member with respect to the pivoting of the torch cable when the torch cable pivots is improved and the twisting of the torch cable is able to be prevented with certainty.

In the transmission mechanism, when the body member pivots around the axis of the arm, the second bevel gear mounted to the body member revolves around the axis of the arm in a state of being engaged with the first bevel gear, which rotates around the axis of the arm, the rotation of the output shaft of the driving unit is able to be transmitted to the feed roller at all times without being affected by the pivoting state of the arm.

The above wire feeding unit may be configured such that a portion of the arm is formed to be a detachable casing, in which the body member is accommodated, and the driving unit is fixed to the casing.

In this configuration, when maintenance of the transmission mechanism and the driving unit is implemented, the body member, the transmission mechanism and the driving unit are able to be easily dismounted together with the casing from the arm by removing the casing from the arm.

Likewise, when the transmission mechanism and the driving unit are mounted, the job of mounting and adjusting the transmission mechanism and the driving unit is able to be easily implemented, because the job can be carried out in a state that the wire feeding unit is removed from the arm.

Moreover, even when the mounting position of the body member is changed, the driving unit, a bracket for mounting the driving unit, and the like do not remain on the outer periphery of the arm, so it is capable of adapting to various changes in the specification.

The above wire feeding unit may be configured such that the torch cable is separated into a tip side cable attached to a tip portion of the body member and a base end side cable attached to a base end portion, and an electrically conductive wire for supplying electricity to the welding torch, shield gas that is fed to the welding torch, and cooling water that is fed to the welding torch are accommodated in the torch cable from the base end portion of the base end side cable to the tip portion of the tip side cable through the inside of the body member.

Here, in the case of thick plate welding, the electric current required for welding is large and the electrically conductive wire is thick, so the diameter of the torch cable becomes large. Since such a torch cable having a large diameter has a large minimum bending radius, a large space has to be reserved inside the arm to allow the torch cable to bend inside the arm.

Particularly, when the welding robot is used in a state of being hung from a ceiling, since it may be used in a condition in which the fore-and-aft direction is reversed, the twisted angle of the torch cable becomes double compared to being used in a state in which it is placed on a floor.

In a welding robot, it is necessary to pass through water, which serves for cooling a welding torch, in the inside of a torch cable, and in the case that a water supply cable for feeding the water into the torch cable is connected to the torch cable at a base end portion of the arm, the maintenance of the water supply cable becomes troublesome.

In the above configuration, the base end side cable is made to extend outside the arm, and allows a power supply cable, a gas cable and a water feeding cable to be connected to the base end portion of the base end side cable at a position apart from the arm. At this time, the whole of the torch cable is twisted when the arm pivots around its axis, because the base end portion of the base end side cable is restricted from pivoting around its axis due to the fact that a power supply cable, a gas cable and a water feeding cable are connected to the base end portion of the base end side cable. However, the length from the tip portion of the tip side cable to the base end portion of the base end side cable is so long that the torch cable 2 is not partially twisted. That is, the torch cable is subjected to just a little load due to the twisting, so the durability of the torch cable may not be reduced.

Moreover, since the length from the tip portion of the tip side cable to the base end portion of the base end side cable is so long that the bending of a torch cable having a large minimum bending radius is able to be dealt with and it is not necessary to reserve a large space.

Furthermore, since the power supply cable, the gas cable and the water feeding cable are connected to the base end portion of the base end side cable at a position apart from the arm, the workability of maintenance is able to be improved.

The above wire feeding unit may be configured such that an electrically conductive wire passing-through hole, a gas feeding hole and a water feeding hole pass through the body member from the base end portion to the tip portion so as to bypass the portion in which the feed roller is mounted, the electrically conductive wire is accommodated in the base end side cable and the tip side cable through the electrically conductive wire passing-through hole, the shield gas is accommodated in the base end side cable and the tip side cable through the gas feeding hole, and the cooling water is accommodated in the base end side cable and the tip side cable through the water feeding hole.

In this configuration, it becomes possible to reduce the size of the body member by forming the electrically conductive wire passing-through hole, the gas feeding hole and the water feeding hole so as to bypass the portion in which the feed roller is mounted.

According to the wire feeding unit of the present invention, since the body member pivots by following the pivoting of the torch cable, the torch cable is able to be prevented from being partially twisted and the durability of the torch cable is able to be enhanced.

DESCRIPTION OF THE PREFERRED EMBODIMENTS

An embodiment of the present invention will now be described in detail with reference to the attached drawings when deemed appropriate.

Figure 1:
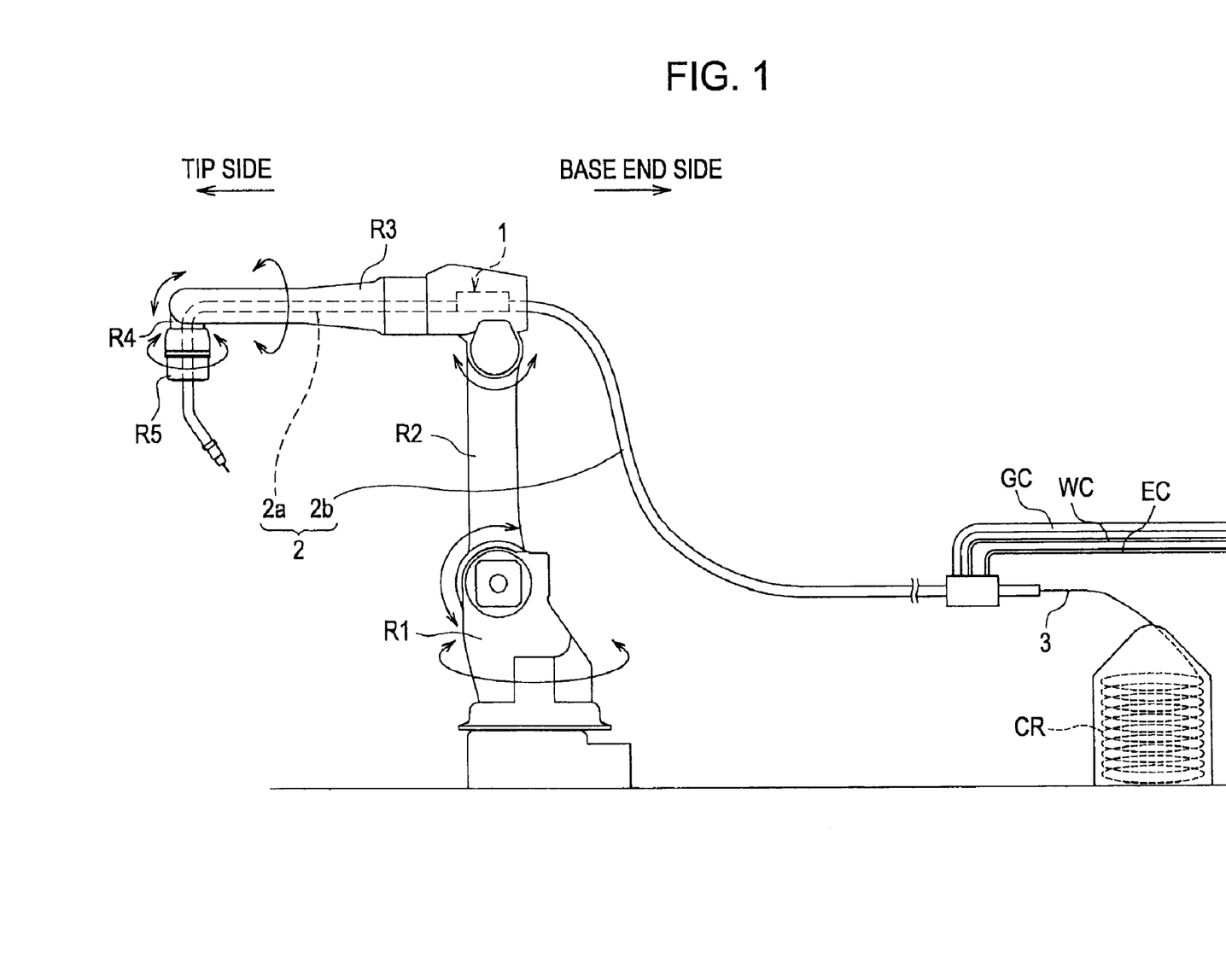
FIG. 1 is a cross-section view of a welding robot of an embodiment according to the present invention.

A welding robot R of this embodiment is a robot having a multiarticular arm, as illustrated in FIG. 1, and includes a base portion R1 installed on a floor surface, a lower arm R2 raised up from the base portion R1, an upper arm R3 extending in a lateral direction from the top portion of the lower arm R2, and a tip arm R4 mounted at the tip portion of the upper arm R3. In this welding robot R, a welding torch R5 is mounted at the tip portion of the tip arm R4 and a wire feeding unit 1 is provided in the base end portion of the upper arm R3.

The upper portion of the base portion R1 is freely pivotable around a vertical axis, while the lower end portion of the lower arm R2 is joined to the upper portion of the base portion R1 in a state of being freely tiltable in a vertical direction. Likewise, the base end portion of the upper arm R3 is joined to the upper end portion of the lower arm R2 in a state of being freely tiltable in a vertical direction.

The tip portion of the upper arm R3 is freely pivotable around its axis with respect to the base end portion. To the tip portion of the upper arm R3, the base end portion of the tip arm R4 is joined in a state of being freely tiltable in a vertical direction. Moreover, the welding torch R5 mounted at the tip portion of the tip arm R4 is freely pivotable around the axis of the tip arm R4.

In the welding robot R, a torch cable 2 is passed through the inside of both the upper arm R3 and the tip arm R4 in the respective axis directions from the base end portion of the upper arm R3, and is connected to the welding torch R5 at the tip portion of the tip arm R4.

Figure 2:
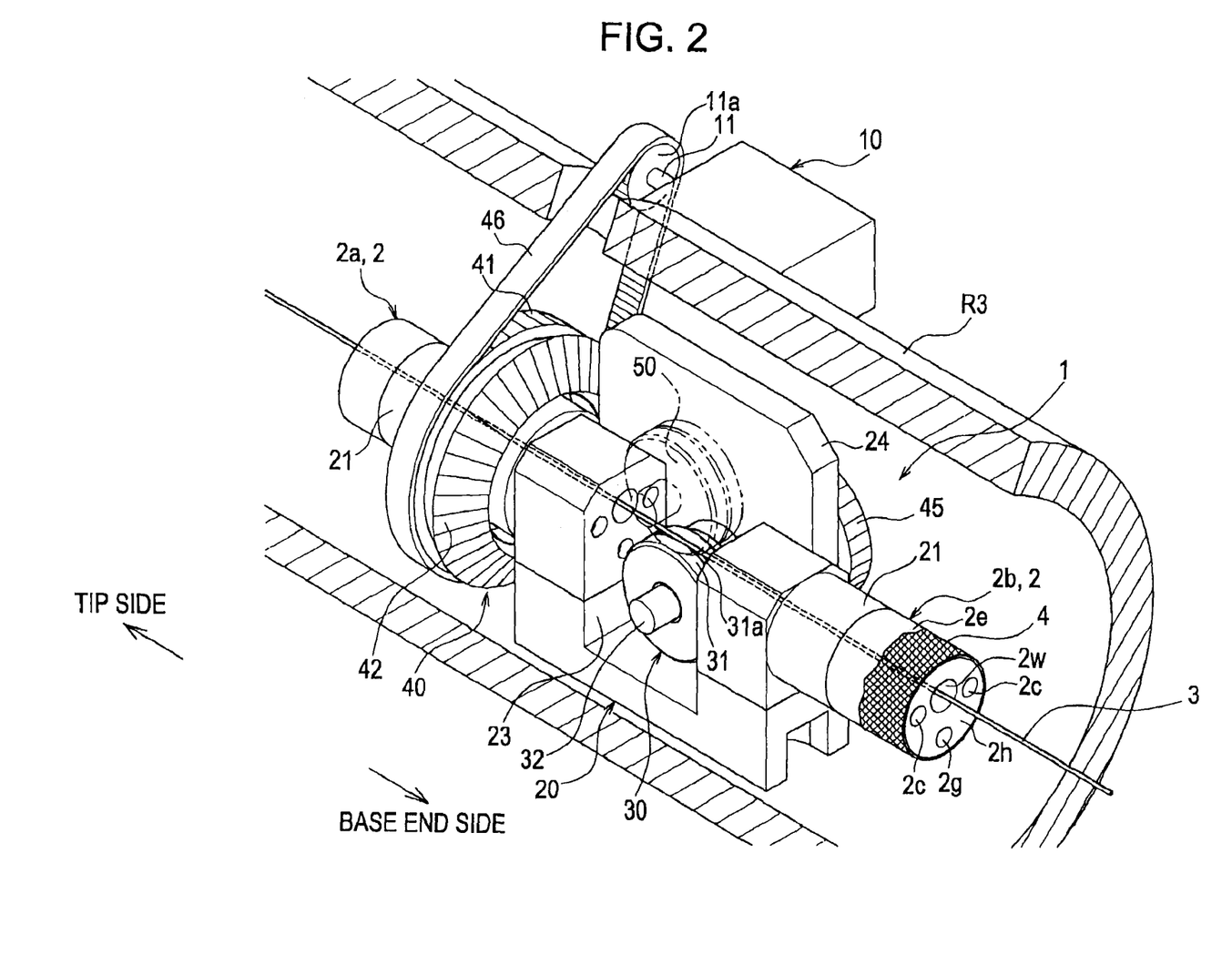
FIG. 2 is a perspective view of a wire feeding unit of the embodiment as seen from the side of its feed roller.

As illustrated in FIG. 2, the torch cable 2 is a multi-layered cable composed of a core member made of plastic, an electrically conductive wire 4 that covers the outer periphery of the core member 2h, and an insulating member 2e covering the electrically conductive wire 4 for insulation. In the core member 2h, a wire passing-through hole 2w for passing through a welding wire 3 is formed along the center axis as well as a gas feeding hole 2g for feeding shield gas and a water feeding hole 2c for feeding cooling water are each formed along the wire passing-through hole 2w.

This torch cable 2 is separated into a tip side cable 2a that extends toward the tip side of the upper arm R3 from the wire feeding unit 1 provided in the base end portion of the upper arm R3, and a base end side cable 2b that extends toward the outside of the upper arm R3 from the wire feeding unit 1, as illustrated in FIG. 1.

In the torch cable 2, the welding wire 3 drawn out from a cable reel CR provided outside the welding robot is inserted from the base end face of the base end side cable 2b. This welding wire 3 passes through the wire feeding unit 1 from the base end side cable 2b and is inserted into the tip side cable 2a.

To the base end portion of the base end side cable 2b, there are connected a power supply cable EC for supplying electricity to the electrically conductive wire 4 in the torch cable 2, a gas cable GC for supplying shield gas to the gas feeding hole 2g (refer to FIG. 2) in the base end side cable 2b, and a water supplying cable WC for supplying cooling water to the water feeding hole 2c (refer to FIG. 2) in the base end side cable 2b.

The wire feeding unit 1 is provided with a driving unit 10 fixed onto an outer periphery of the upper arm R3, a body member 20 mounted on an inner periphery of the upper arm R3 in a state of being freely pivotable around the axis of the upper arm R3, a feed roller 30 mounted to the body member 20 in a state of being freely rotatable around an axis orthogonal to the axis of the upper arm R3, and a transmission mechanism 40 for transmitting the rotation of an output shaft 11 of the driving unit 10, as illustrated in FIG. 2.

Figure 4A:
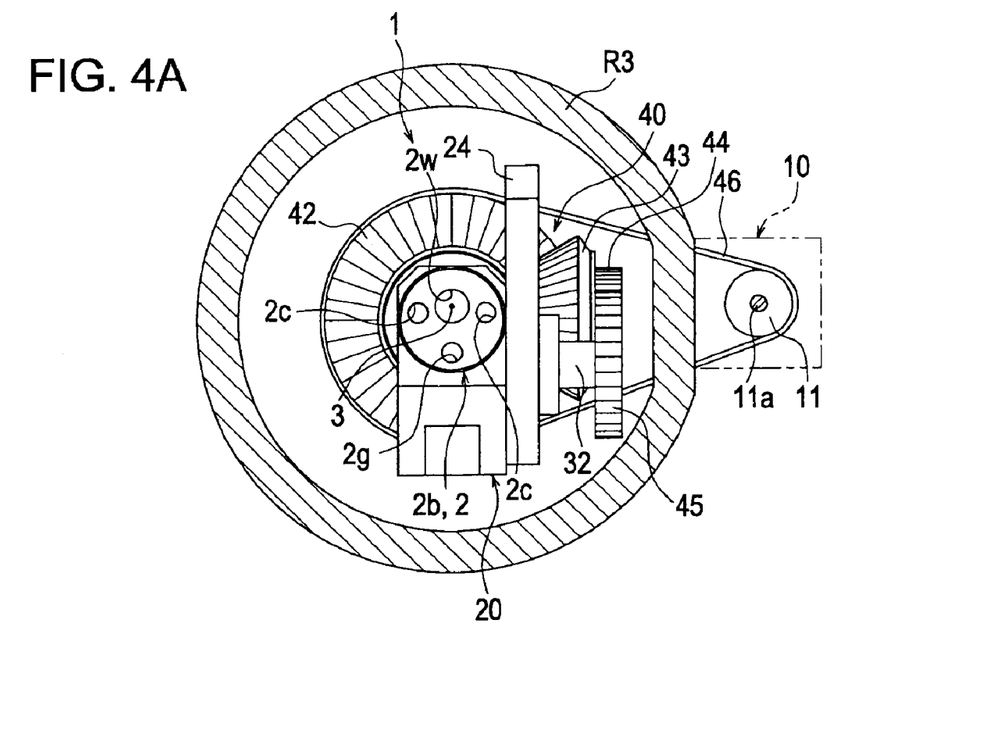
FIG. 4A is a view of the wire feeding unit of the embodiment as seen from its tip side.

The driving unit 10 is an electric motor fixed onto an outer periphery of the upper arm R3 (refer to FIG. 4A), and the output shaft 11 of the driving unit 10 is arranged in parallel to the axis of the upper arm R3 and has a drive gear 11a mounted on its tip.

Figure 5:
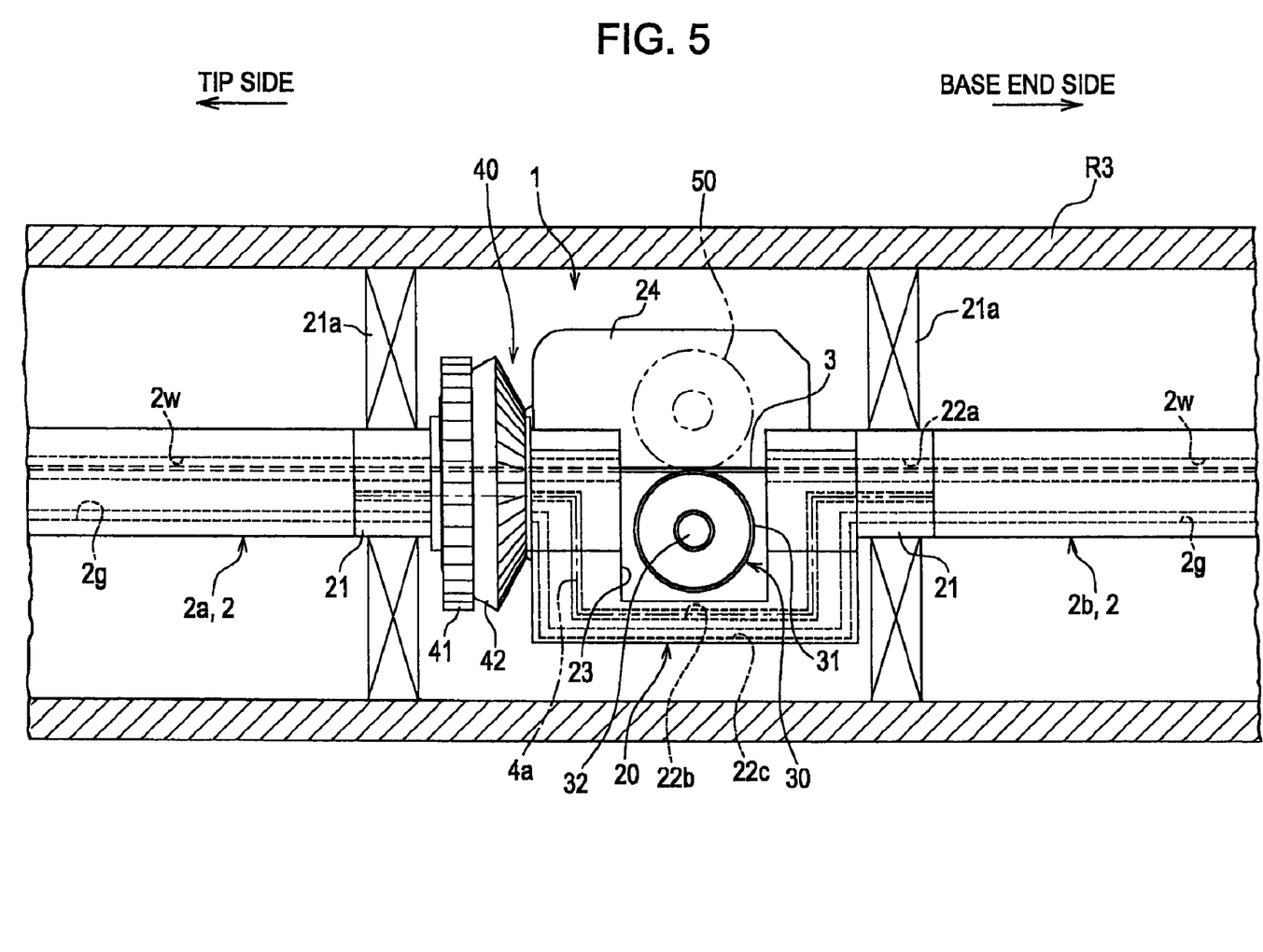
FIG. 5 is a side view of the wire feeding unit of the embodiment as seen from the side of its feed roller.

The body member 20 is a block body disposed in a manner that its longitudinal direction is aligned with the axis of the upper arm R3 as illustrated in FIG. 5, and cylindrical column-shaped support portions 21, 21 project from its tip portion and base end portion, respectively.

Figure 4B:
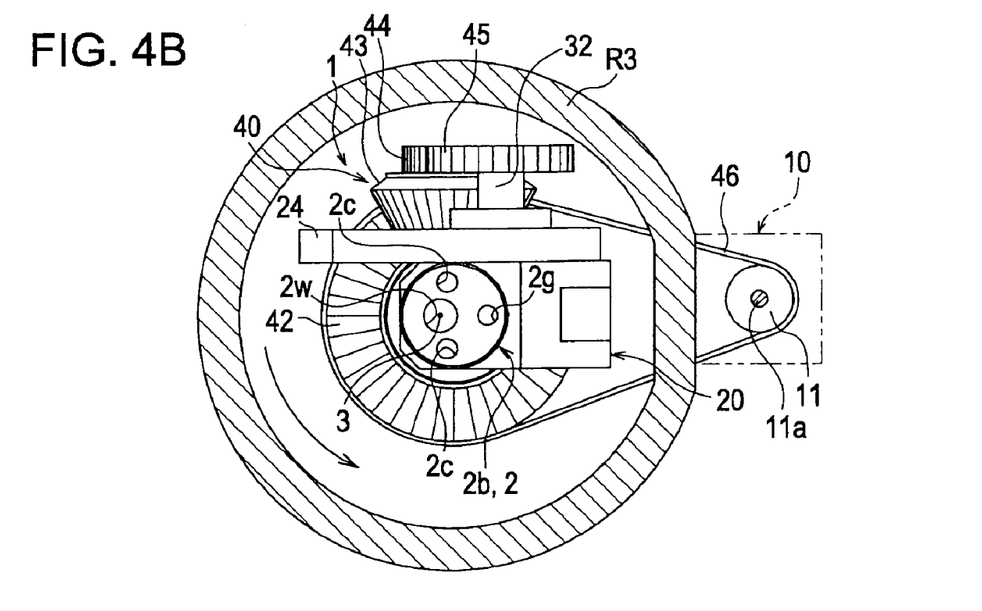
FIG. 4B is a view of the wire feeding unit in a state of being pivoted from the state shown in FIG. 4A.

The support portions 21, 21 are held on an inner peripheral surface of the upper arm R3 through the intermediary of bearings 21a, 21a, and thereby the body member 20 is enabled to be freely pivotable with respect to the inner peripheral surface of the upper arm R3 (refer to FIG. 4B).

Onto the tip side surface of the support portion 21 on the tip side, the base end side surface of the tip side cable 2a is attached securely, and onto the base end side surface of the support portion 21 on the base end side, the tip side surface of the base end side cable 2b is attached securely.

Figure 6:
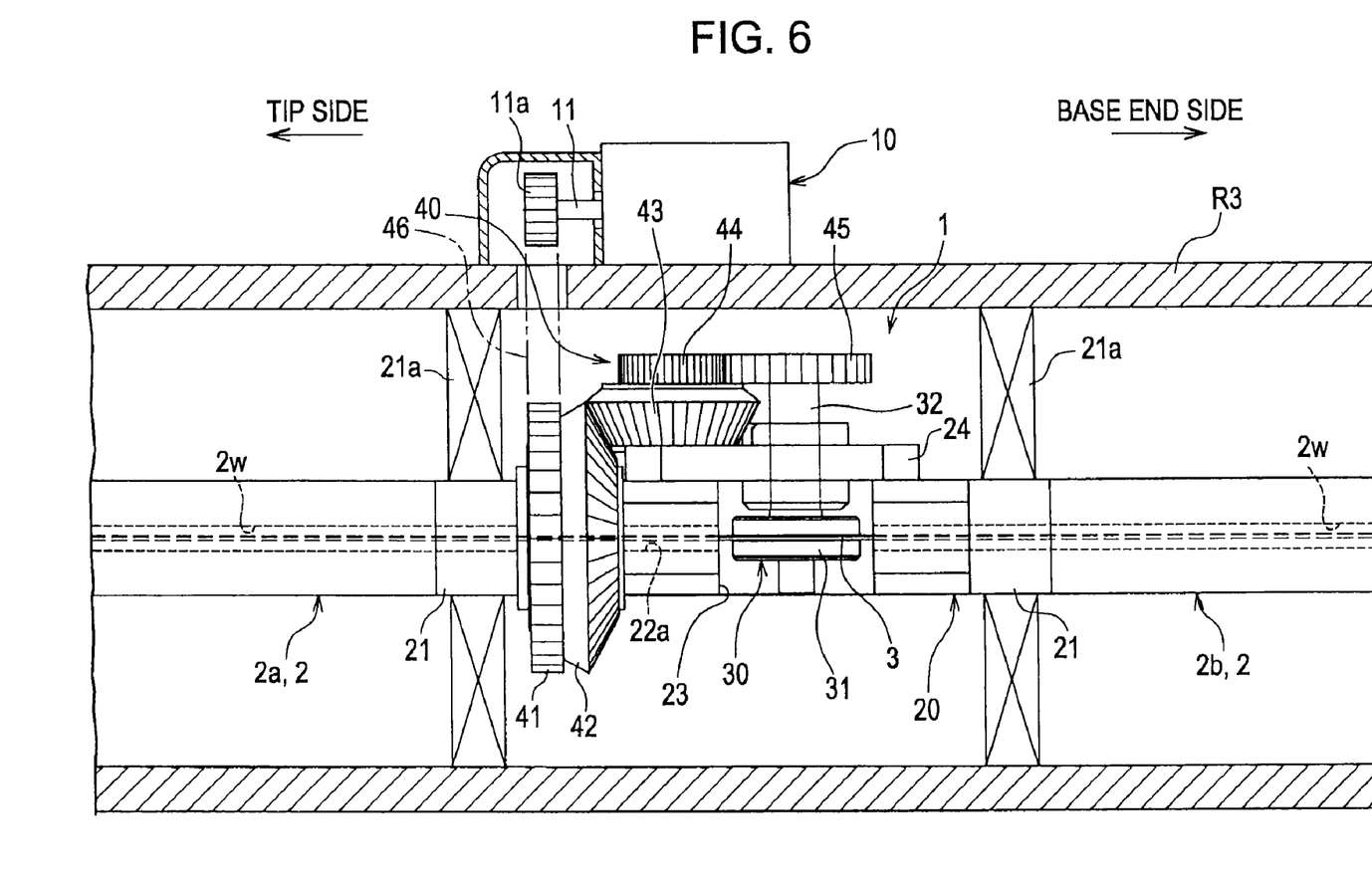
FIG. 6 is a plan view of the wire feeding unit of the embodiment.

There is formed a recessed portion 23 in the central portion of the body member 20 in its axis direction, and the body member 20 is provided with a side plate 24 so as to close one of side openings of the recessed portion 23 as illustrated in FIG. 6.

In the body member 20, wire passing-through holes 22a are formed so as to across the body member in its axis direction, and are connected to the wire passing through holes 2w of the tip side cable 2a and the base end side cable 2b, respectively, as illustrated in FIG. 5, each of the wire passing-through holes 22a being opened toward the inside of the recessed portion 23. Accordingly, when the welding wire 3 is threaded from the wire passing through hole 2w of the base end side cable 2b to the wire passing through hole 2w of the tip side cable 2a through the wire passing-through holes 22a of the body member 20, the welding wire 3 is exposed in the inside of the recessed portion 23 and passes across the recessed portion 23 in the axis direction.

In the body member 20, an electrically conductive wire passing-through hole 22b is formed to pass through from the support portion 21 on the base end side to the support portion 21 on the tip side so as to bypass the recessed portion 23, and a line-like electrically conductive wire 4a connected to the electrically conductive wire 4 of each of the base end side cable 2b and the tip side cable 2a is threaded in the electrically conductive wire passing-through hole 22b.

Likewise, in the body member 20, a gas feeding hole 22c is formed to pass through from the support portion 21 on the base end side to the support portion 21 on the tip side so as to bypass the recessed portion 23, and the gas feeding hole 22c is connected to the gas feeding hole 2g of each of the base end side cable 2b and the tip side cable 2a.

Furthermore, in the body member 20, a water feeding hole (not shown) is formed to pass through from the support portion 21 on the base end side to the support portion 21 on the tip side so as to bypass the recessed portion 23, and the water feeding hole is connected to the water feeding hole 2c of each of the base end side cable 2b and the tip side cable 2a (refer to FIG. 2).

The reduction in size of the body member 20 is thus enabled by forming the electrically conductive wire passing-through hole 22b, the gas feeding hole 22c and the water feeding hole (not shown) so as to bypass the recessed portion 23, in which the feed roller 30 is mounted, as described above.

In the recessed portion 23, there is disposed the feed roller 30 that has a circumferential surface 31 formed around an axis orthogonal to the axial direction of the upper arm R3.

The feed roller 30 is provided with a support shaft 32 that projects in a direction orthogonal to the axial direction of the upper arm R3, and is inserted through a mounting hole formed in the side plate 24, as illustrated in FIG. 6. The tip portion of the support shaft 32 projects outside the side plate 24, and has a second transmission gear 45 mounted thereon.

The feed roller 30 is arranged so that the circumferential surface 31 makes contact with the welding wire 3 in the recessed portion 23. In a central portion of the circumferential surface 31 in its width direction, there is formed a guide groove 31a throughout the entire perimeter of the circumferential surface 31, as illustrated in FIG. 2. The guide groove 31a serves to restrict the position of the welding wire 3, which comes into contact with the circumferential surface 31.

In the recessed portion 23, as illustrated in FIG. 5, a press roller 50 is disposed so as to constitute a pair of rollers together with the feed roller 30, pinching the welding wire 3 therebetween. This press roller 50 is mounted to the side plate 24 in a state of being freely rotatable around an axis orthogonal to the axial direction of the upper arm R3, and is applied with pressing force toward the feed roller 30 using a spring member (not shown) provided in the body member 20. Therefore, the welding wire 3 pinched between the feed roller 30 and the press roller 50 is pressed against the circumferential surface 31 of the feed roller 30, and is in a state of being caught in the guide groove 31a.

As the feed roller 30 rotates around the axis of the support shaft 32, the welding wire 3, which is pressed against the circumferential surface 31, is fed in an axial direction toward the tip side of the upper arm R3 due to its friction force with the circumferential surface 31.

The transmission mechanism 40 serves to transmit the rotation of the output shaft 11 of the driving unit 10 to the feed roller 30 as illustrated in FIG. 6, and is provided with a driven gear 41 mounted in a base end portion of the body member 20, a first bevel gear 42 rotating in synchronization with the driven gear 41, a second bevel gear 43 rotating in engagement with the first bevel gear 42, a first transmitting gear 44 rotating in synchronization with the second bevel gear 43, and a second transmitting gear 45 rotating in engagement with the first transmitting gear 44. Between the drive gear 11a of the output shaft 11 of the driving unit 10 and the driven gear 41, a drive belt 46 is looped over.

The driven gear 41 is a ring-like spur gear mounted on the outer periphery of a base end portion of the body member 20 in a state of being freely rotated around the axis of the upper arm R3 (refer to FIG. 2). The transmission of rotation of the output shaft 11 of the driving unit 10 by the drive belt 46 causes the driven gear 41 to rotate around the axis of the upper arm R3 on the outer periphery of the base end portion of the body member 20.

The first bevel gear 42 is a bevel gear mounted on the outer periphery of a base end portion of the body member 20 in a state of being freely rotated around the axis of the upper arm R3 (refer to FIG. 3), and has a gear face formed toward its tip side. This first bevel gear 42 is coupled with the driven gear 41 and rotates in synchronization with rotation of the driven gear 41 around the axis of the upper arm R3 on the outer periphery of the base end portion of the body member 20.

The second bevel gear 43 is a bevel gear mounted on the outside of the side plate 24 in a state of being freely rotatable around an axis orthogonal to the axial direction of the upper arm R3 (refer to FIG. 3), and has a gear face formed toward the outside surface of the side plate 24. This second bevel gear 43 is engaged with the first bevel gear 42 and rotates in synchronization with rotation of the first bevel gear 42 around the axis orthogonal to the axial direction of the upper arm R3.

Figure 3:
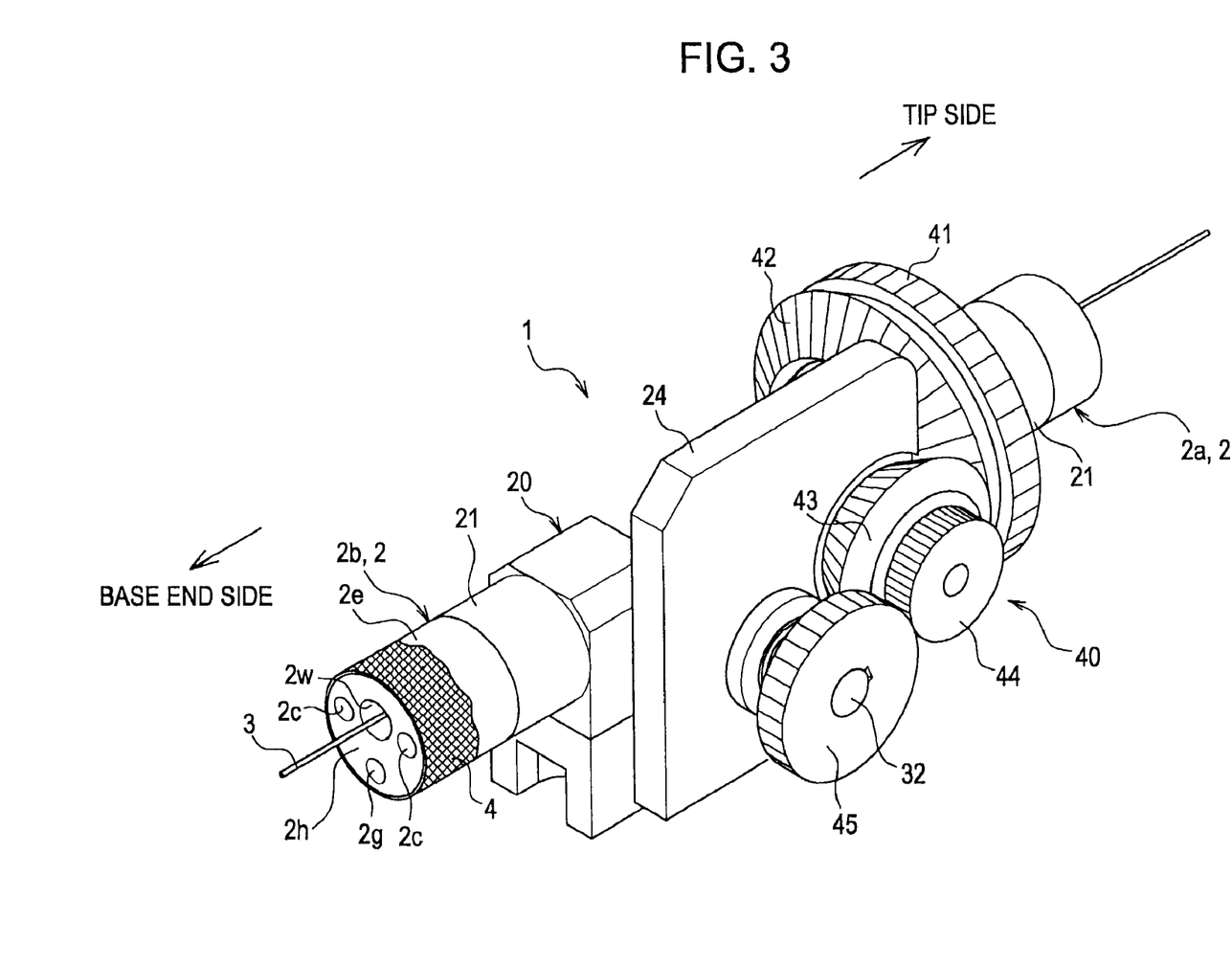
FIG. 3 is a perspective view of the wire feeding unit of the embodiment as seen from the side of its transmission gears.

The first transmitting gear 44 is a spur gear mounted on the outside of the side plate 24 in a state of being freely rotatable around an axis orthogonal to the axial direction of the upper arm R3 (refer to FIG. 3). This first transmitting gear 44 is coupled with the second bevel gear 43 on its outside and rotates in synchronization with rotation of the second bevel gear 43 around the axis orthogonal to the axial direction of the upper arm R3.

The second transmitting gear 45 is a spur gear mounted on the tip portion of the support shaft 32 of the feed roller 30 on the outside of the side plate 24 of the body member 20 (refer to FIG. 3). This second transmitting gear 45 is engaged with the first transmitting gear 44 and rotates in synchronization with rotation of the first transmitting gear 44 around the axis orthogonal to the axial direction of the upper arm R3.

In the transmission mechanism 40 like this, when the output shaft 11 of the driving unit 10 rotates, the rotation is transmitted to the driven gear 41 by the drive belt 46, and the rotation of the driven gear 41 around the axis of the upper arm R3 is transmitted to the second bevel gear 43 via the first bevel gear 42 and is thereby converted into rotation around an axis orthogonal to the axial direction of the upper arm R3. Then, the rotation is transmitted from the second bevel gear 43 to the second transmitting gear 45 via the first transmitting gear 44; the rotation is thus transmitted to the support shaft 32 and the feed roller 30 rotates around the axis orthogonal to the axial direction of the upper arm R3.

The wire feeding unit 1 configured as described above operates as described below and provides advantages of the present invention.

In the welding robot R illustrated in FIG. 1, the welding torch R5 is moved to a desired position by pivoting the base portion R1 around a vertical axis, while tilting the lower arm R2, the upper arm R3 and the tip arm R4, and further by pivoting the upper arm R3 and the tip arm R4 around the respective axes. After that, welding work is performed with the welding wire 3, electric power, shield gas and cooling water supplied through inside the torch cable 2.

When the upper arm R3 or the tip arm R4 is pivoted around its axis, the tip side cable 2a follows the pivoting to pivot around the axis. At this time, in the wire feeding unit 1 of this embodiment, the body member 20 pivots to follow the pivoting of the tip side cable 2a as illustrated in FIG. 4B, so it is possible to prevent the tip side cable 2a from being partially twisted and to enhance the durability of the torch cable 2.

In addition, the body member 20 is made smaller and lighter by fixing the driving unit 10 on an outer periphery of the upper arm R3, and thereby the following ability of the body member 20 with respect to the tip side cable 2a is improved, which enables to prevent the tip side cable 2a from being twisted with certainty.

In the transmission mechanism 40, since the second bevel gear 43 mounted to the body member 20 revolves around the axis of the upper arm R3 in a state of being engaged with the first bevel gear 42, which rotates around the axis of the upper arm R3, when the body member 20 pivots around the axis of the upper arm R3, the rotation of the output shaft 11 of the driving unit 10 is able to be transmitted to the feed roller 30 at all times without being affected by the pivoting state of the upper arm R3.

Incidentally, the torch cable 2 is twisted when the upper arm R3 pivots around its axis, because the base end portion of the base end side cable 2b is restricted from pivoting around its axis due to the fact that a power supply cable EC for supplying electric power to the electrically conductive wire 4, a gas cable GC for feeding shield gas to the gas feeding hole 2g, and a water feeding cable WC for feeding cooling water to the water feeding hole 2c are connected to the base end portion of the base end side cable 2b as illustrated in FIG. 1. However, the length from the tip portion of the tip side cable 2a to the base end portion of the base end side cable 2b is so long that the torch cable 2 is not partially twisted. That is, the torch cable 2 is subjected to just a little load due to the twisting, so the durability of the torch cable 2 may not be reduced.

Moreover, since the length from the wire feeding unit 1 to the base end portion of the base end side cable 2b is so long that the bending of a torch cable 2 having a large minimum bending radius is able to be dealt with.

Furthermore, since the power supply cable EC, the gas cable GC and the water feeding cable WC are connected to the base end portion of the base end side cable 2b at a position apart from the upper arm R3, the workability of maintenance is able to be improved.

Although an embodiment of the present invention has been described, the invention is not limited to the embodiment and any change in the design may be practiced as appropriate in a range not departing from the spirit and scope of the invention.

Figure 7:
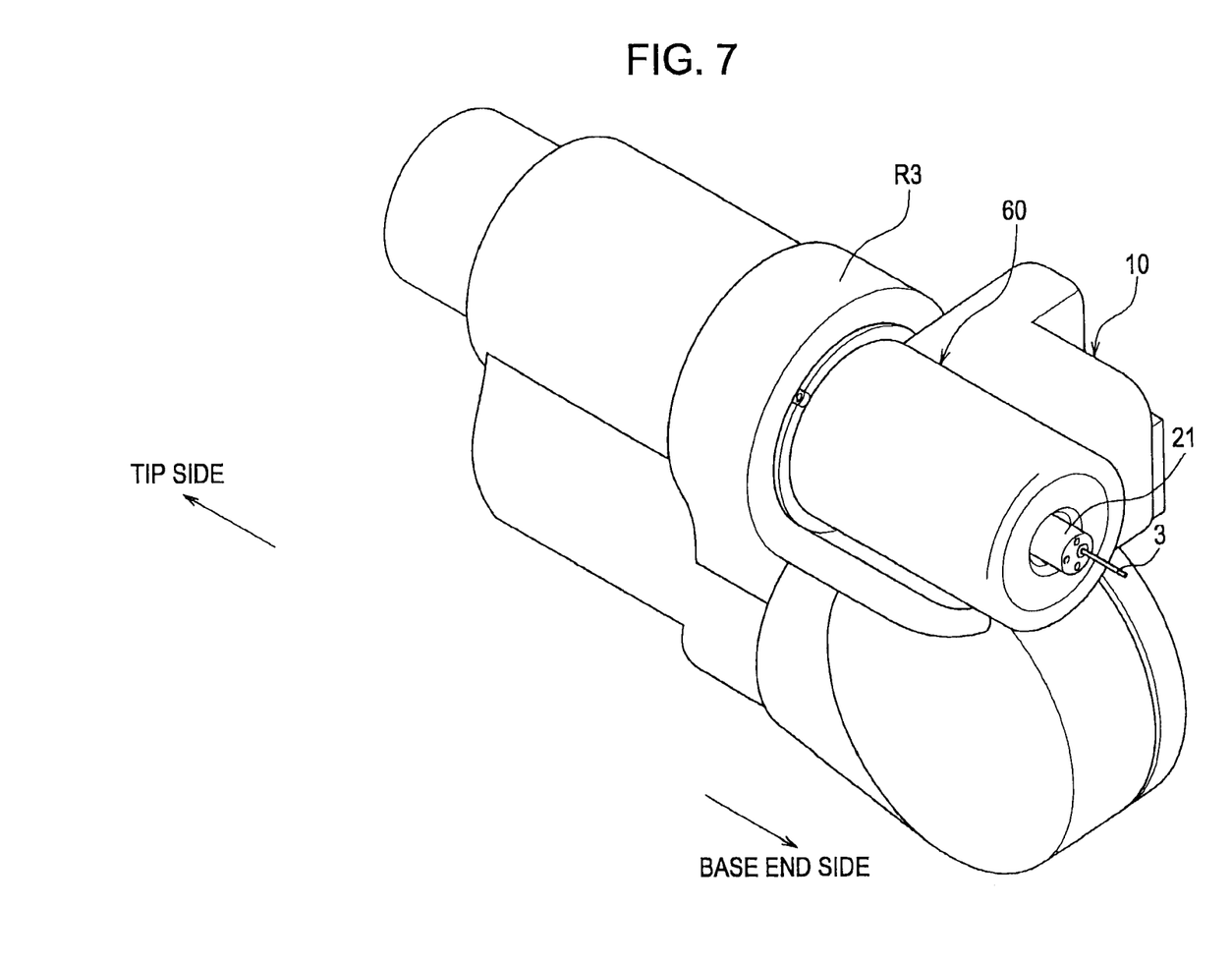
FIG. 7 is a perspective view of a wire feeding unit of another embodiment according to the present invention.
Figure 8:
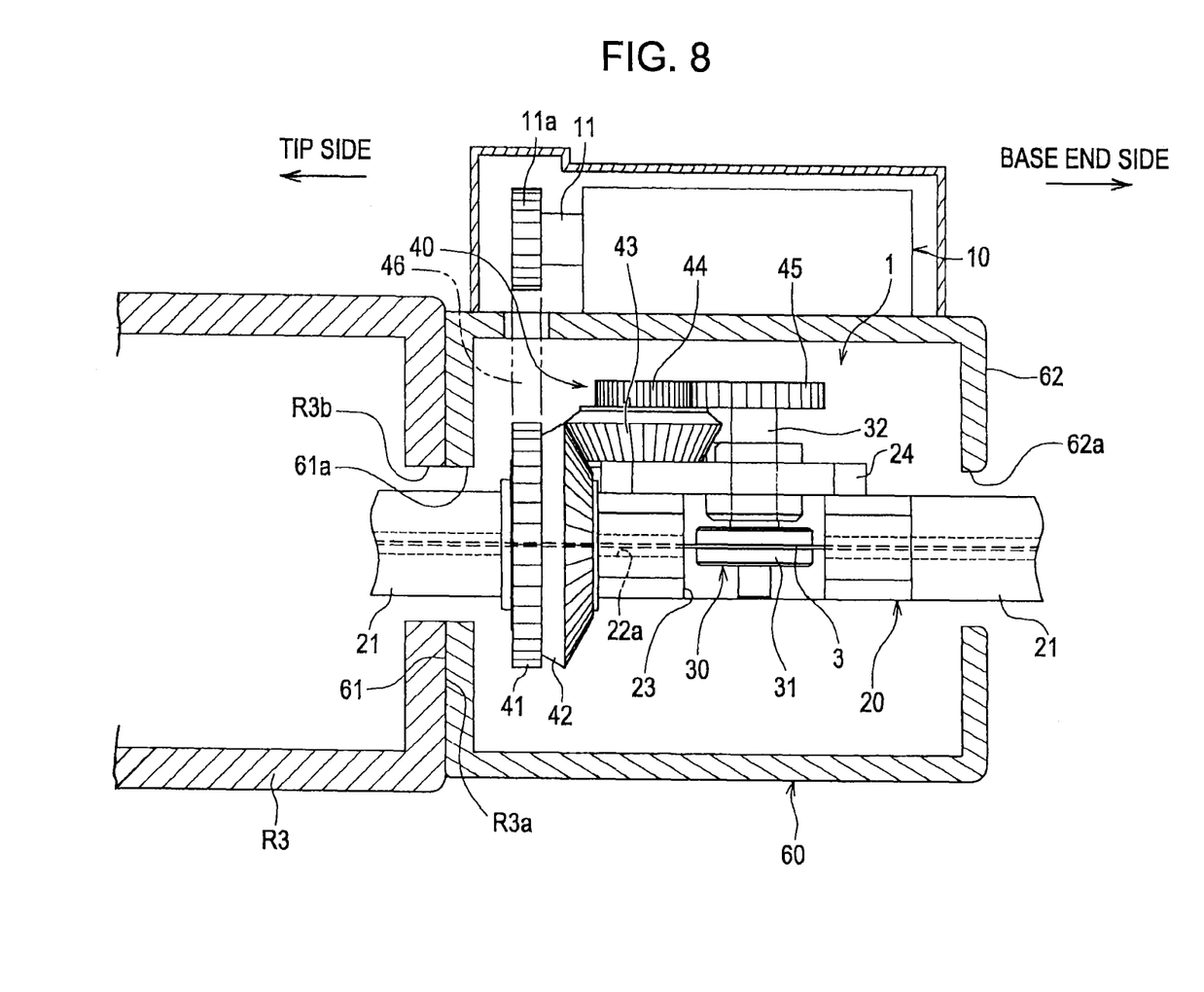
FIG. 8 is a plan view of the wire feeding unit of another embodiment.

For example, as illustrated in FIG. 8, a portion of an upper arm R3 is able to be formed as a detachable casing 60 (refer to FIG. 7), and a body member 20 is able to be accommodated in the casing 60.

The casing 60 is a cylindrical member, and its tip side face 61 has a passing-through hole 61a formed in a central portion thereof, while its base end side face 62 has a passing-through hole 62a formed in a central portion thereof. The tip side face 61 of the casing 60 is detachably mounted to a mounting face R3a formed on the upper arm R3 using joint members such as bolts. The passing-through hole 61a of the tip side face 61 of the casing 60 is connected to a passing-through hole R3b formed in the mounting face R3a of the upper arm R3.

The body member 20 accommodated in the casing 60 has support portions 21, 21, which are formed in its tip portion and base end portion and project outside the casing 60 through the passing-through holes 61a, 62a, respectively. The support portion 21 on the tip side is inserted into the inside of the upper arm R3 through the passing-through hole R3b of the upper arm R3.

On an outer periphery of the casing 60, a driving unit 10 is fixed, and a drive belt 46 is looped over a drive gear 11a of an output shaft 11 of the driving unit 10 and a driven gear 41 of a transmission mechanism 40 mounted to the body member 20. Incidentally, since the casing 60 is a portion of the upper arm R3, fixing of the driving unit 10 on the casing 60 translates into fixing of the driving unit 10 on the upper arm R3.

In this configuration, when maintenance of the transmission mechanism 40 and the driving unit 10 is implemented, the body member 20, the transmission mechanism 40 and the driving unit 10 are able to be easily dismounted from the upper arm R3 by removing the casing 60 from the upper arm R3.

Likewise, when the transmission mechanism 40 and the driving unit 10 are mounted, the job of mounting and adjusting the transmission mechanism 40 and the driving unit 10 is able to be easily implemented, because the job can be carried out in a state that the wire feeding unit 1 is removed from the upper arm R3.

Moreover, even when the mounting position of the body member 20 is changed, the driving unit 10, a bracket for mounting the driving unit 10, and the like do not remain on the outer periphery of the upper arm R3, so it is capable of adapting to various changes in the specification.

It is noted that although the support portions 21, 21 of the body member 20 are each held on an inner peripheral surface of the upper arm R3 through the intermediary of bearings (not shown) in the embodiment illustrated in FIG. 8, the support portions 21, 21 may be each held on an inner peripheral surface of the casing 60 through the intermediary of bearings. In this case, since the casing 60 is a portion of the upper arm R3, mounting of the body member 20 on an inner peripheral surface of the casing 60 translates into mounting of the body member 20 on an inner peripheral surface of the upper arm R3.

In the transmission mechanism 40 of the embodiment illustrated in FIG. 2, the weight of the body member 20 is reduced by fixing the driving unit 10 on an outer periphery of the upper arm R3, but it may be possible to mount a compact and lightweight driving motor onto the body member 20 and to allow the driving motor to drive the feed roller 30 directly. In this case, since the transmission mechanism 40 is omitted, the configuration of the wire feeding unit 1 is able to be simplified.

Moreover, although the rotation of the second bevel gear 43 is transmitted to the support shaft 32 of the feed roller 30 via the first transmitting gear 44 and the second transmitting gear 45 in the transmission mechanism 40 of the embodiment, the first transmitting gear 44 and the second transmitting gear 45 is able to be omitted by mounting a second bevel gear 43 on the tip portion of the support shaft 32.

Likewise, although the rotation of the output shaft 11 of the driving unit 10 is transmitted to the first bevel gear 42 via the driven gear 41 in the transmission mechanism of the embodiment, the driven gear 41 is able to be omitted by looping the drive belt 46 over the first bevel gear 42.

What is claimed is:

1. A wire feeding unit for feeding a welding wire in a robot having a plurality of arm members including one arm member that is an elongated arm member which is elongated so as to define an axis of the arm member extending in the direction of elongation of the arm member, the arm member comprising a base end and a tip end at opposite sides of the arm member along the axis of the arm member, the wire feeding unit comprising:

a body member mounted in the arm member so as to be freely pivotable in the arm member around the axis of the arm member;

a torch cable mounted to the body member, the torch cable passing from the base end of the arm member through the inside of the arm member and being connected to a welding torch mounted at the tip end of the robot, wherein the welding wire is inserted through the torch cable;

a feed roller mounted to the body member so as to be freely rotatable around an axis orthogonal to the axis of the arm member, wherein the welding wire passing through the body member is exposed out of the torch cable and is fed in a direction of the axis of the arm member by the rotation of the feed roller.

2. The wire feeding unit according to claim 1, wherein a driving unit for rotating the feed roller is fixed on the arm member, and a transmission mechanism for transmitting the rotation of an output shaft of the driving unit includes:

a first bevel gear mounted to the body member so as to be freely rotatable around the axis of the arm member; and a second bevel gear mounted to the body member so as to be freely rotatable around an axis orthogonal to the axis of the arm member, wherein the rotation transmitted from the output shaft of the driving unit to the first bevel gear is transmitted to the feed roller though the second bevel gear.

3. The wire feeding unit according to claim 2, wherein a portion of the arm member is formed to be a detachable casing in which the body member is accommodated, and the driving unit is fixed to the casing.

4. The wire feeding unit according to claim 1, wherein the torch cable is separated into a tip side cable attached to a tip portion of the body member and a base end side cable attached to a base end portion of the body member, and wherein an electrically conductive wire for supplying electricity to the welding torch, a shield gas to be fed to the welding torch, and cooling water to be fed to the welding torch are accommodated in the torch cable from the base end side cable to the tip side cable, through the inside of the body member.

5. The wire feeding unit according to claim 4, wherein an electrically conductive wire passing-through hole, a gas feeding hole and a water feeding hole pass through the body member from the base end portion to the tip portion so as to bypass the portion in which the feed roller is mounted;

the electrically conductive wire is accommodated in the base end side cable and the tip side cable through the electrically conductive wire passing-through hole;

the shield gas is accommodated in the base end side cable and the tip side cable through the gas feeding hole; and the cooling water is accommodated in the base end side cable and the tip side cable through the water feeding hole.

* * * * *